Feb. 9, 1960 W. HOROWITZ ET AL 2,924,704
TRANSMIT RECEIVE BLOCKING CIRCUIT
Filed Nov. 5, 1954
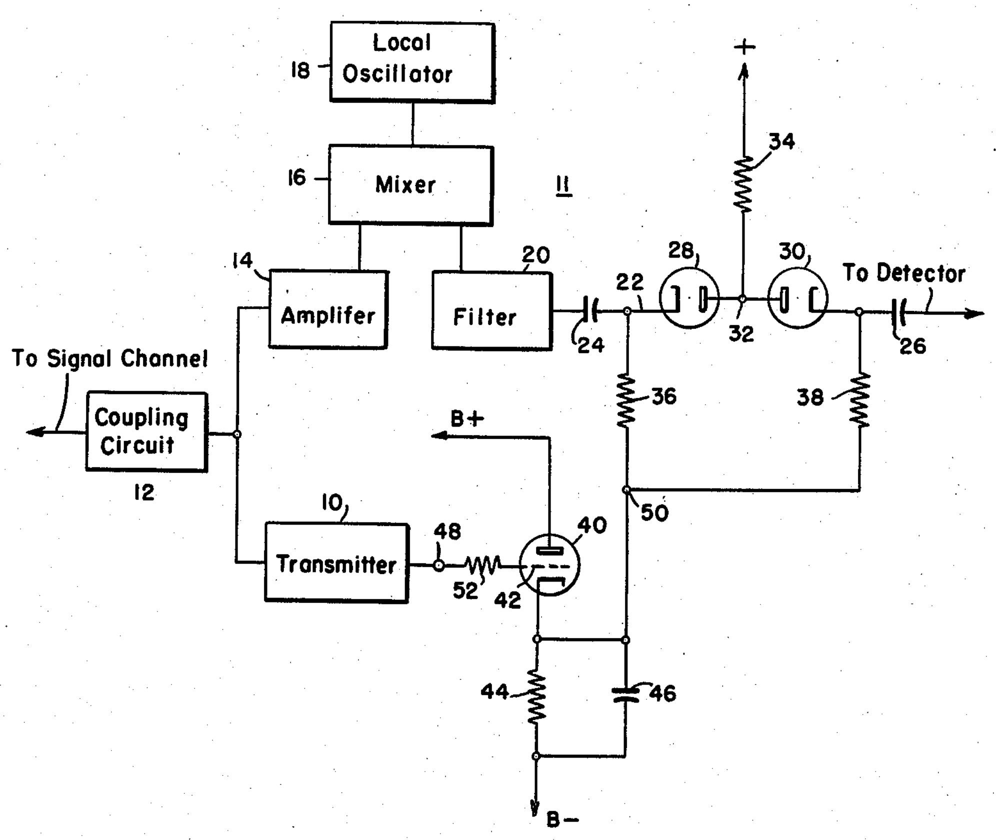
WITNESSES:
E. A. McCloskey
J. H. Murray
INVENTORS
William Horowitz
and Herbert S. Slack.
BY
F. E. Browder
ATTORNEY 2,924,704

TRANSMIT RECEIVE BLOCKING CIRCUIT

William Horowitz, Flushing, N.Y., and Herbert S. Slack, Baltimore, Md., assignors to Westinghouse Electric Corporation, East Pittsburgh, Pa., a corporation of Pennsylvania Application November 5, 1954, Serial No. 466,996

1 Claim. (Cl. 250—13)

This invention relates to transmitter-receiver combinations and more particularly to means for disabling the receiver of such a combination during signal transmission.

In certain two-way communication systems, signals are transmitted between two or more stations on a single carrier frequency. Each station in this type of system is equipped with a local transmitter for sending signals to other stations and a local receiver for receiving signals from those other stations. The signal channel connecting the various stations in the system may comprise either a conducting cable or radio wave energy. When a signal is received from another station in a typical communication system of the type described above, it is attenuated due to losses in the signal transmission channel. For present purposes it will be assumed that this attenuation is equal to $x$ decibels. When the local transmitter is on, its signal will be detected by the local receiver since both of these units are connected to a common signal channel. In this case, however, the signal is not attenuated by channel losses; and, therefore, it is larger than signals received from other stations in the system by an amount equal to approximately $x$ decibels. It is conceivable that the automatic volume control circuit of the local receiver could compensate for this larger signal. The automatic volume control circuit, however, has by necessity a long discharge time constant. Consequently, when the local transmitter goes off, the receiver requires considerable time to recover to a condition for receiving remote signals attenuated by $x$ decibels. This condition is obviously undesirable.

Accordingly, it is an object of this invention to provide a blocking circuit between a receiver and a transmission channel to attenuate signals received from a local transmitter in a transmitter-receiver combination.

It is another object of the invention to provide a blocking circuit which introduces small losses when not blocking.

A further object of the invention lies in the provision of a blocking circuit which can be controlled from a change in positive D.C. voltage derived from a high impedance source.

In accordance with the invention, the receiver of a terminal station in a two-way communication system is connected to a transmission channel through two diodes having their anodes joined. The junction of the anodes is connected to a source of positive D.C. voltage. A triode vacuum tube is provided having its grid potential controlled by the local transmitter of the station. During signal transmission, the grid of the vacuum tube is biased positively so that the tube conducts heavily. By connecting the cathodes of the aforesaid diodes to the cathode circuit of the triode in cathode follower relationship, a positive bias will be applied to the cathodes of the diodes during signal transmission. The local signals are in this way attenuated by an amount equal to or greater than the channel attenuation of remote signals. Therefore, the local signal is equal to or less than the remote signal when fed to the receiver and the time delay which would otherwise be introduced by the automatic volume control circuit of the receiver, as explained above, is eliminated.

Further objects and features of the invention will become apparent from the following detailed descriptive matter taken in connection with the accompanying single-figure drawing which illustrates the invention schematically.

Referring to the drawing, it can be seen that both a transmitter 10 and receiver 11 are connected to a signal channel, not shown, via coupling circuit 12. The receiver of the system is of the superheterodyne type in which the frequency of an incoming signal is heterodyned to a new radio frequency (called the intermediate frequency) before detection. Received signals from coupling circuit 12 are first amplified by amplifier 14 and are then fed into mixer circuit 16. In this circuit, the incoming signals are mixed with the output of local oscillator 18 to produce the intermediate frequency referred to above. The output of mixer circuit 16 is fed through filter 20 to a signal channel 22.

Included in channel 22 are a pair of coupling capacitors 24 and 26 and a pair of diodes 28 and 30 having their anodes joined at point 32. A source of positive D.C. voltage, not shown, is connected to point 32 through resistor 34. The cathodes of diodes 28 and 30 are connected via resistors 36 and 38 to the cathode of a triode vacuum tube 40. The bias on grid 42 of tube 40 is controlled by transmitter 10. This bias may rise to a constant value whenever transmitter 10 is in operation or it may vary as a function of the amplitude of a transmitted signal, depending upon the design used.

The anode of tube 40 is connected to a source of positive voltage in a conventional manner, and its cathode is connected to a negative source of voltage through cathode resistor 44 and bypass condenser 46.

Operation of the circuit can best be understood by the following analysis of the voltages which exists at various points in one embodiment of the invention which has been found to operate satisfactorily. In the stand-by condition with the transmitter 10 off, the voltage at point 48 will be approximately +8.5 volts, the voltage at point 50 will be approximately +14 volts, and the voltage at point 32 will be approximately +16 volts. The diodes 28 and 30 are, therefore, biased in the forward direction and will conduct to pass a signal to the detector of the receiver. When the level of the signal passing through channel 22 reaches the level of the diode bias (2 volts), the circuit becomes a clipper. The level of the signals in channel 22 will not ordinarily get up to the clipping point; and, therefore, the signal will not be distorted by a clipping action. However, the circuit may be used as a clipper, if desired.

When transmitter 10 is in operation, the voltage at point 48 goes to approximately +34 volts. A greater positive bias is, therefore, applied to grid 42, and tube 40 conducts more heavily than when the transmitter is off. The increased conduction in tube 40 causes the voltage at points 50 and 32 to go to +35.5 and +25 volts, respectively. The diodes are now biased in the reverse direction by an amount equal to 10.5 volts so that channel 22 is blocked to received signals.

It has been found that the circuit will operate in the manner described above by using circuit elements having the following ratings:

| | |
|---|---|
| Capacitor **24** | 0.1 microfarad. |
| Capacitor **26** | 270 micromicrofarads. |
| Diodes **28** and **30** | 1N63. |
| Resistor **34** | 33,000 ohms. |
| Resistors **36** and **38** | 20,000 ohms. |
| Triode **40** | 12AU7. |
| Resistor **44** | 6,800 ohms. |
| Capacitor **46** | 1.0 microfarad. |
| Resistor **52** | 1.0 megohm. |
| Positive voltage applied to anode of tube | 40–129 volts. |
| Positive voltage applied to resistor | 34–25 volts. |

The effectiveness of the blocking voltage depends upon the reverse impedance of the diodes and the impedance from point 50 to the source of negative cathode voltage for tube 40.

By using the circuit just described, the block effected by diodes 28 and 30 will be equal to or greater than the attenuation effected by the transmisison channel on a signal received from a remote transmitter. Therefore, the automatic volume control circuit in the receiver will operate at a signal level from the local transmitter equal to or less than a signal level from the remote transmitter. In this manner the time delay introduced by the automatic volume control circuit when no blocking is provided is eliminated.

Although the invention has been described in connection with a certain specific embodiment, it is not limited thereto as it is apparent to those skilled in the art that various changes in form and arrangement of parts can be made to suit requirements without departing from the spirit and scope of the invention.

We claim as our invention:

A communications system comprising a transmitter and a channel for receiving signals, a pair of unidirectional current devices included in said channel, an anode and a cathode for each of said devices, said devices having their anodes joined, a source of positive voltage permanently connected to the junction of said anodes, a space discharge device, the cathodes of said unidirectional current devices connected to said space discharge device in cathode follower relationship, and said transmitter operatively connected to said space discharge device for effecting a reverse bias on said unidirectional current devices to block said channel in response to an output signal from said transmitter.

References Cited in the file of this patent

UNITED STATES PATENTS

| | | |
|---|---|---|
| 2,345,026 | Boykin | Mar. 28, 1944 |
| 2,418,389 | Andresen | Apr. 1, 1947 |
| 2,454,761 | Barrow et al. | Nov. 30, 1948 |
| 2,535,912 | Frank et al. | Dec. 26, 1950 |
| 2,618,753 | Van Mierlo | Nov. 18, 1952 |
| 2,727,143 | Slutz | Dec. 13, 1955 |
| 2,745,956 | Baker | May 15, 1956 |
| 2,782,307 | Von Sivers et al. | Feb. 19, 1957 |